United States Patent [19]
de Lasa et al.

[11] Patent Number: 5,683,589
[45] Date of Patent: Nov. 4, 1997

[54] PHOTOCATALYTIC REACTOR

[75] Inventors: Hugo I. de Lasa; Julio Valladares, both of London, Canada

[73] Assignee: University of Western Ontario, London, Canada

[21] Appl. No.: 403,189

[22] Filed: Mar. 13, 1995

[51] Int. Cl.⁶ .................................................. B01D 17/06
[52] U.S. Cl. .......................... 210/748; 210/763; 210/505; 210/251; 210/323.1; 210/433.1; 210/437; 210/446; 250/215
[58] Field of Search ................................ 210/748, 763, 210/510.1, 503, 505, 506, 507, 501, 502.1, 251, 323.1, 433.1, 437, 446, 497.01; 502/5, 242, 527; 250/215

[56] References Cited

U.S. PATENT DOCUMENTS

| | | |
|---|---|---|
| 3,246,767 | 4/1966 | Pall et al. ............................ 210/506 X |
| 4,732,879 | 3/1988 | Kainowski et al. ....................... 502/5 |
| 4,892,712 | 1/1990 | Robertson et al. ..................... 422/186 |

*Primary Examiner*—Ana Fortuna
*Attorney, Agent, or Firm*—R. Craig Armstrong

[57] ABSTRACT

The reactor has two tubes arranged concentrically, one having a larger diameter than the other, the tubes thus defining an inner channel and an outer channel. The inner channel contains an elongated light source, such as a bulb or a fiber optic bundle receiving sunlight from a solar collector, radiating light outwardly, the light including a substantial component of light having a wavelength of less than 390 nm. The outer channel has at least one and preferably a number of angled conical baskets arranged therein, each basket covering all of the channel and having a face supporting a fiber glass mesh thereon, exposed towards the light. An alternative embodiment reflects sunlight inwardly towards a single tube with baskets. Each basket has a plurality of small apertures therethrough to permit water to pass therethrough, and the mesh is impregnated with $TiO_2$ particles. Preferably, the inner surface of the outer channel is reflective. The mesh is prepared by a process which includes treatment of the $TiO_2$ particles with methanol, preferably in a 25% solution with water, or with some other suitable dispersant prior to placement on the substrate.

9 Claims, 11 Drawing Sheets

EFFECT OF INITIAL MeB CONCENTRATION
□ Co=39.4uM  ▽ Co=20.4uM  ◇ Co=9.4uM  △ Co=3.8uM

PHOTOCATALYTIC REACTOR

BACKGROUND OF THE INVENTION

1. Field of the Invention

This invention relates to the removal of organic contamination from water, via a photocatalytic reactor using $TiO_2$.

Pollution control should consider abatement of pollutant emissions at chemical plant sites. This approach of pollution abatement at the source renders environmental control a manageable task.

For example, a major industrial pollution problem affecting the petrochemical area around Sarnia, Ontario, Canada is related to the periodic and frequent accidental discharges of chlorocompounds and other organic compounds into the St. Clair river. The task of controlling pollutant levels in the St. Clair river is currently being conducted with a number of posts analyzing pollutant levels and toxic chemicals at the ppb level on an hourly basis. These stations are placed downstream from the industrial sites of several petrochemical companies in Sarnia, allowing for early warnings. Typical compounds being continuously monitored are the following: chloroform, carbon tetrachloride, 1,2-dichloroethane, trans 1,2 dichloroethene, trichloroethene, tertrachlorethene, 1,2-dichloropropane, benzene, 1,2-dichlorebenzene, toluene, xylenes, ethylbenzene, diethylbenzene and styrene. A communication system immediately reports unacceptably high concentration levels of toxic chemicals and provides early preparedness to the towns of Courtright and Wallaceburg on the Canadian side, and Marysville, Marine City and Algonc on the United States side of the river. Water flows and conditions of the pollutant dispersion, however, mean that once toxic chemicals are discharged in the river, they reach the water source of an important region of SouthWestern Ontario in a few hours, with adverse effects on population, marine life and plants.

The source of these emissions is very frequently linked to leakage of chlorophenolic compounds and other organics from heat exchangers or other cooling water equipment of the plants. Even advanced heat exchanger designs, subject to tight maintenance programs, are always affected by corrosion and leaks to the water cooling System. This circumstance is always of major concern to petrochemical plant operators.

Water cooling in chemical plants is an essential part of process operation. Because of evaporation losses and to prevent undesirable concentration of minerals, there is a requirement of adding fresh water and discharge cooling water. As a result of this, contaminated cooling water may very quickly reach the water discharge of the plant and toxic chemicals may flow towards the river producing environmentally damaging effects. This is a most dangerous situation with a very negative impact on the ecosystem of rivers such as the St. Clair.

Most modern chemical plants have facilities for waste water treatment including physical treatment for sedimentation of floating particles, chemical methods for the removal of colloidal matter and biological treatment for the removal of organic materials. Waste water treatment plants, however, are essentially targeted to treat relatively fixed volumes of water, having high inertia, being unable to deal in a short period of time (1 hour) with larger additional water purification requirements. This is the case of the water streams contaminated with chemicals coming from the water cooling system of the plant. There is also a similar event arising when the petrochemical plants receive heavy rain and the water purification facilities are unable to handle the sudden increase in water purification and discharge requirements.

There is thus a need for technology that could directly be implemented at a petrochemical site to improve safety and prevent chemical leakages. Apart from the above specific example, there is a need generally for means for removing contamination from water.

2. Description of the Prior Art

Water purification using photocatalysts is one of the most promising methodologies of the so-called advanced oxidation processes. Recently, attention has been mainly directed towards $TiO_2$ as the photocatalyst of choice due to several important properties of this material such as insolubility, non-toxicity, powerful oxidizing ability, excitation with solar light and ready attachment to various types of supports. The notable qualities of $TiO_2$ have made it a very favourable photocatalyst for applications such as those of water decontamination to ultrapure water. The possibilities of this technology are quite impressive given the minimum energy cost or essentially no energy cost if solar energy is employed for powering the photoreactors. Potential applications for photocatalytic reactors cover the degradation of a whole spectrum of impurity levels contained in industrial waste waters and potable domestic water. A most relevant application of this technique is the mineralization of chlorinated pollutants such as chlorophenols and PCBs. It also appears that $TiO_2$ could also be applied very effectively for the photoconversion of air-borne pollutants.

Others have recognized the potential interest of the $TiO_2$ for the photocatalytic degradation of pollutants, and have found that by using a light beam with a wave length of 365 nm it was possible to achieve complete degradation of chloroorganic molecules. A number of catalysts are available for this process (e.g. $TiO_2$, ZnO). However, it appears that from the catalysts considered, the $TiO_2$ in the anatase crystalline form is the catalyst with the potentially higher prospects. To excite $TiO_2$, it has to be irradiated with a light beam having a wavelength smaller than 390 nm. Thus, under the proper reaction conditions the $TiO_2$ or supported $TiO_2$ can produce significant pollutant mineralization.

Recent studies show activity of the $TiO_2$ to convert a wide range of compounds (phenols, cathecol, naphthol, chlorophenols, PCB's, benzene, benzoic acid, salicylic acid). Moreover, others have noted that surfactants frequently used in industry could be effectively degraded with photocatalysts. In this respect, tests of photocatalyst performance are frequently conducted in conjunction with measurement of rates of formation of $Cl^-$ and/or $CO_2$. This allows for an effective test of kinetic models suggesting that the photocatalytic reaction follows a Langmuir-Hinselwood mechanism, according to previous researchers.

As stated above, a number of photocatalysts have already been proposed in the technical literature. $TiO_2$ is the dominant preferred photocatalyst, and a number of methods have been proposed for its use, including: suspension of $TiO_2$ particles in slurry reactors; fiber optic probes coated with $TiO_2$ particles and with presumably a section of removed cladding inside the reactor to achieve proper radial distribution of light; and entrapment of $TiO_2$ in a glass mesh.

There are various difficulties or drawbacks with each of these approaches. For example, with suspension of $TiO_2$ particles in a slurry, even with low-medium $TiO_2$ particle concentration, there are difficulties with the limited propagation of light in the milky suspension, and with the recovery of particles smaller than 1 µm. Regarding the use of fiber optics coated with catalyst, the technique is quite limited and requires further development to achieve, in a commercial unit, a high density of coated fibers with proper light supply.

With respect to the use of $TiO_2$ embedded in a glass mesh (immobilized $TiO_2$), that is an option that offers considerable promise. A photocatalytic reactor based on this principle is described in U.S. Pat. No. 4,892,712 (granted in 1990), and is currently commercialized by Nutech Energy Systems Inc. of London, Ontario, Canada. The Nutech unit uses an impregnated mesh with $TiO_2$ "enwraped" coaxially to the emitting light source of the photoreactor. However, in the Nutech unit there is no secure degree of $TiO_2$ loading in the crystalline anatase form. In this reactor, several layers of the mesh cover the emitting source. The "enwraped mesh" is placed in a cylindrical channel, and the water stream contacts the "enwraped mesh" during circulation through this channel. However, there is no intimate, controlled and uniform contact of the water with the mesh. The water stream flows close to the "enwraped mesh", essentially by-passing the mesh (poor contact) and with a very limited fraction of the mesh being irradiated. Thus, a low generation of electron/hole pairs can be expected with simultaneous deficient contact of the contaminated water with the available electron/hole pairs.

Even though there is significant photocatalysis research currently developed around the world, and particularly significant activity with laboratory reactors using immobilized $TiO_2$, none of the existing technology provides an adequate solution to the problem.

SUMMARY OF THE INVENTION

In view of the above, it is an object of the invention to provide a photocatalytic reactor which provides effective treatment of contaminated water, using a $TiO_2$-impregnated mesh through which the water must percolate.

As stated above, the use of $TiO_2$-impregnated mesh is known. However, the present invention involves a novel reactor using such impregnated mesh, as well as improved methods of impregnation.

One aspect of the invention is thus the reactor and its configuration. A second aspect of the invention is the $TiO_2$-impregnated mesh and its method of preparation.

In the invention, the reactor has two tubes arranged concentrically, one having a larger diameter than the other, the tubes thus defining an inner channel and an outer channel. The inner channel contains an elongated light source radiating light outwardly, the light including a substantial component of light having a wavelength of less than 390 nm. The outer channel has at least one and preferably a number of angled conical baskets arranged therein, each baskets covering all of the channel and having a face supporting a fiber glass mesh thereon, exposed towards the light. The basket further has a plurality of small apertures therethrough to permit water to pass therethrough, and the mesh is impregnated with $TiO_2$ particles. Preferably, the inner surface of the outer channel is reflective.

The mesh is prepared by a process which includes treatment of the $TiO_2$ particles with methanol or some other suitable dispersant prior to placement on the substrate, as is explained in detail below.

Further features of the invention will be described or will become apparent in the course of the following detailed description.

BRIEF DESCRIPTION OF THE DRAWINGS

In order that the invention may be more clearly understood, the preferred embodiment thereof will now be described in detail by way of example, with reference to the accompanying drawings, in which.

DETAILED DESCRIPTION OF THE PREFERRED EMBODIMENT

The reactor of the present invention attempts to optimize the following geometrical and reactor characteristics: flow patterns through baskets, mass transfer on the mesh, illumination, quantum yields and $TiO_2$ loadings. Fiber glass mesh supported in the baskets is impregnated with as near as possible to optimum $TiO_2$ loadings. Prototypes were manufactured at The University of Western Ontario, in London, Ontario, Canada.

The ideal or optimum $TiO_2$ loading, or impregnation factor, is a single layer of tightly-packed particles. Theoretical calculations, based on uniform spherical particles, indicate an optimum weight ratio of 26% $TiO_2$ to achieve this optimum loading. However, given the non-spherical nature of the $TiO_2$ crystals and some potential influence of repulsive forces between small particles, presumably the estimated "best achievable" arrangement of $TiO_2$ will be about half of the optimum impregnation, or about 13 wt %.

Based on the 13 wt % "best achievable", the 8.5 wt % levels which were in fact achieved in the prototype, as measured by SEM-EDX, are very acceptable.

Figure 1:
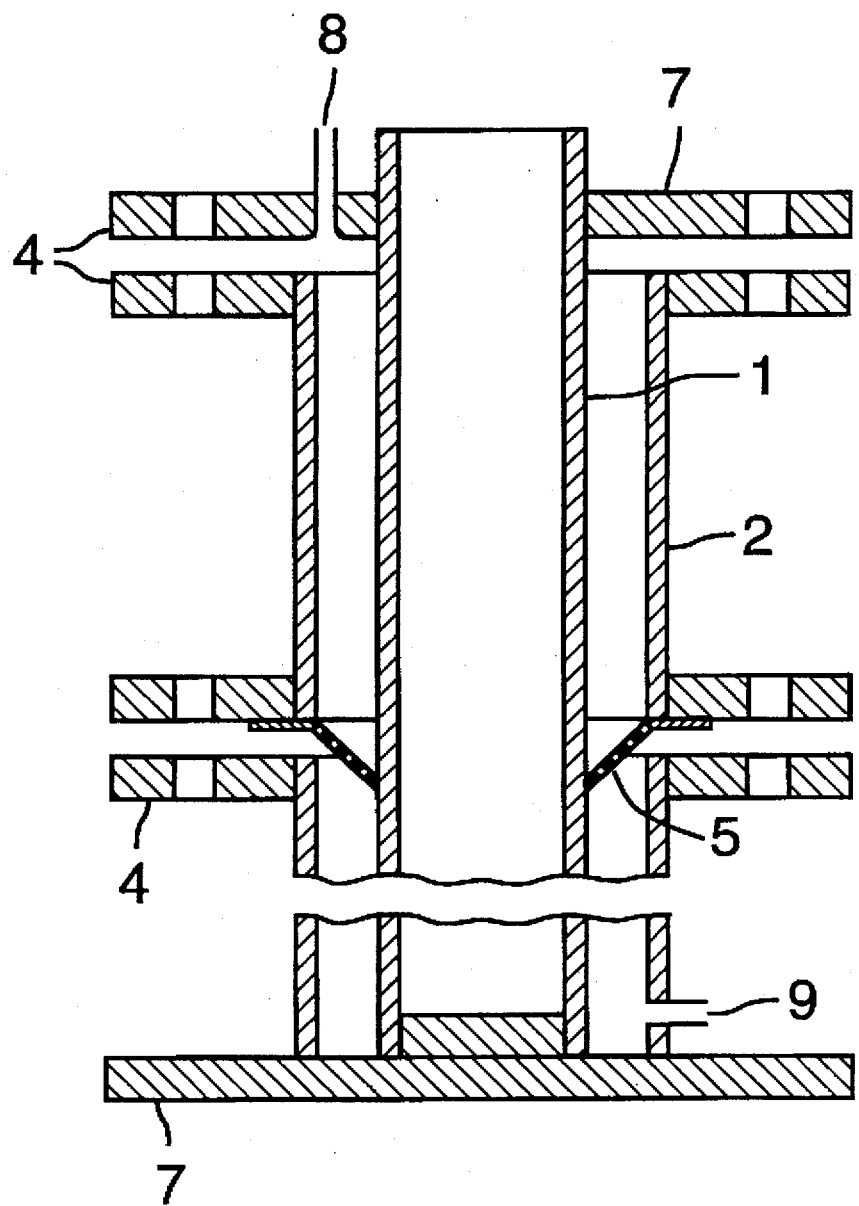
FIG. 1 is a cross-section of the reactor, showing one of the baskets with screens placed at 45 degrees.
Figure 2:
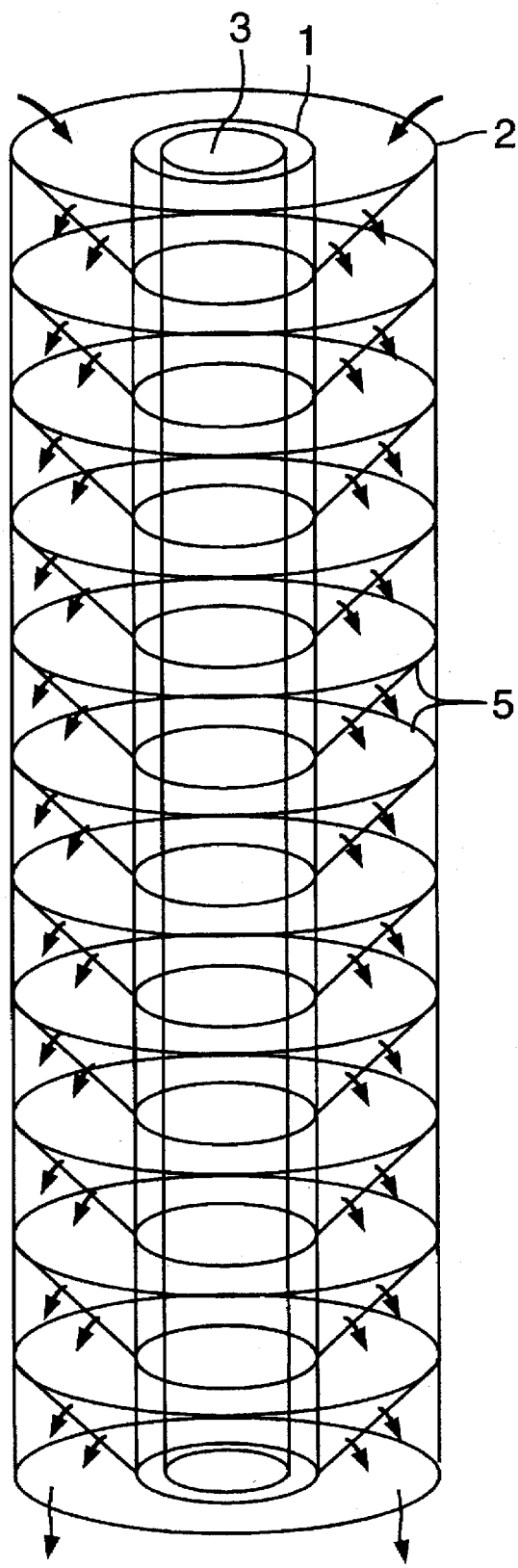
FIG. 2 is a schematic perspective of the reactor, showing the lamp position, annular channel, inner and outer tubes and baskets with screens supporting the glass mesh.

The prototype reactor, as illustrated in FIG. 1, has two concentric tubes of 2 m. length, defining an inner channel 1 and an outer channel 2, the outer channel preferably having a specular surface to reflect light back towards the inner channel. The inner channel contains a light source 3, described in greater detail below. The outer tube is actually made from a number of separate segments, clamped together by flanges 4. In the outer channel there are a number of baskets 5, positioned at each flange location, each basket supporting high density fiber glass mesh screens 6 embedded with $TiO_2$ particles. FIG. 1 only shows one such basket, but in fact there are a number of baskets, as seen in FIG. 2. These baskets are placed in strategic locations, i.e. across the water flow and with 45° inclination with respect to the reactor longitudinal axis. The baskets are perforated plates 7 holding fiber glass mesh, for a good and intense contact of water circulating through the mesh. These baskets can be fabricated from perforated stainless steel metal plate with 30–40% of open area.

Given a geometrical configuration for the photoreactor (dimensions of the concentric channel, dimensions of the lamp) and loading of the $TiO_2$ in the mesh, an overriding criterion to determine the desired number of baskets is the one of maximizing the Thermodynamic Photocatalytic Efficiency Factor (TPEF). The TPEF is defined considering the following energy terms:

$Q_{in}$ represents the light emitted by the lamp $Q_{used}$ represents the light energy used in useful photochemical conversion The TPEF can be defined as:

$TPEF = Q_{used}[Kj/s]/Q_{in}[Kj/s]$

Then, to maximize the TPEF for a given $Q_{in}$ or lamp power, and in order to increase as much as possible the fraction of light $Q_{used}$, enough baskets should be employed for "completely covering" the lamp "view angle". For instance, an observer placed outside the unit should not "see" the lamp. Thus, all rays emitted by the source should directly interact (first evolution in the system) with glass mesh before reaching either by reflection or by penetration through the mesh other surfaces (e.g. walls, baskets). In the case of the prototype of the invention, given its dimensions, about 15 baskets were needed to satisfy this criterion.

Also, baskets should be correctly positioned to avoid "overlapping" or basket (mesh) positioning in "dark regions" of the unit (i.e. no direct source rays reaching these areas). Areas that do not see the source should not have the opportunity to be irradiated and consequently the immobilized $TiO_2$ should not have the opportunity to be excited and should not contribute to the photochemical conversion.

In summary, the number of baskets and their locations is closely related to the TPEF and the maximization of this factor in order to yield a design with optimum performance.

The high and uniform loading of $TiO_2$ particles in each one of the fiber glass mesh elements gives high rates of pollutant photoconversion. The 45 degree inclination of the screens secures irradiation on all areas (screen skin and mesh internal areas) of the screen.

The ends of the tubes are closed by end caps 7, with one end cap having a water inlet 8 into the outer channel, and the other having a water outlet 9 from the outer channel.

The annular reactor configuration allows for a high degree of glass mesh irradiation. The photoreactor was designed in such a way that direct irradiation of the upper "skin" of the mesh is secured. These areas are the ones in the view angle of the source and are directly irradiated, i.e. they "see" the source. All other mesh areas are irradiated as well, given low light mesh absorption in a single mesh layer or high degree of reflected light by internal surfaces. In summary, this design secures a high degree of illumination of the mesh, with an estimated 80% of the light reaching the mesh surface. A high degree of containment of the emitted light inside the reactor and minimum leaks and losses is achieved by virtue of the specular surfaces of the internal walls of the outer channel.

In the prototype reactor, the outer tube is 9 cm external diameter and the inner tube is 4 cm internal diameter. The light source 3 is a UV lamp with a 15 watt power beam having a peak irradiation density at 365 nm. A Gilson pump (not shown), capable of providing variable flow rates of 100–1000 ml/min, provides a 120 ml/min flow rate through the reactor.

The mesh with its high loading of immobilized $TiO_2$ particles was achieved employing Degussa P25 particles (0.02 μm). The fiber glass mesh was impregnated employing a dispersant agent (methanol). Various water-methanol concentrations between 0–50% were employed, it being found that a plateau of 25% methanol concentration achieved the best dispersion and high loading of $TiO_2$ in the glass mesh. SEM-EDX was employed for both the confirmation of the high loading of $TiO_2$ (8.5 wt %) as well as a verification of the excellent and uniform distribution of the particles on the surface of the dense fiber mesh. The superior degree of $TiO_2$ attachment to the surface was also checked by subjecting the glass mesh to 30 hours of water flow service with velocities typical to the ones to be used in the large scale photoreactor. Minimal losses of $TiO_2$ were observed which confirmed the "anchoring state" of the particles (high degree of particle attachment) to the mesh surface.

The openings of the baskets, perforated plates supporting the glass mesh, are carefully chosen in order to provide proper pressure drops across the plates. It was considered to be normally advisable to have about a 10% pressure drop across each basket, to achieve good fluid distribution. In one measured example, with a head of liquid at 0.4 KPa, the pressure drop across the mesh was estimated at 0.02 KPa, and the pressure drop across the perforated plate was estimated at 0.04 KPa, for a combined pressure drop of 0.06 KPa, or about 15%.

This significant pressure drop avoids liquid maldistributions and inefficient contact between the water stream and the glass mesh holding the $TiO_2$, and achieves high mass transfer, good water-mesh contact and flow redirection as needed by the 45° basket orientation. Thus, the combined screen openings and screen plate-mesh gaps, yield intense and efficient contact of water circulating in close contact with the glass mesh. As well, high mass transfer rates are secured given sudden changes of fluid direction and induced turbulence.

Figure 3:
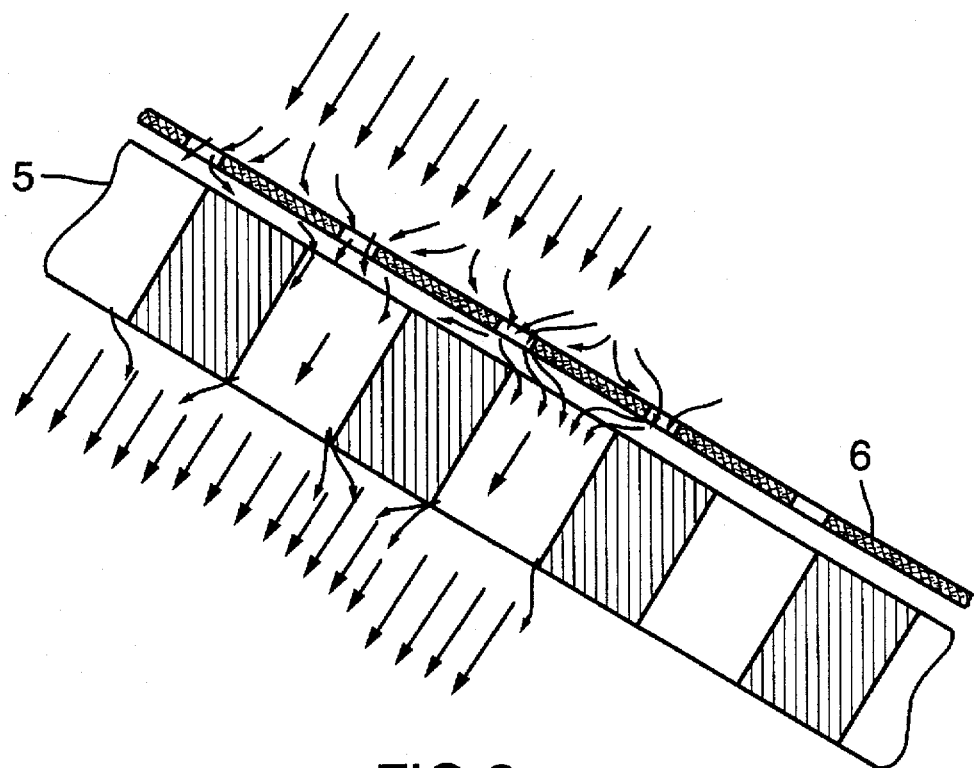
FIG. 3 is a schematic side view of the flow patterns in the vicinity of the baskets holding the glass mesh.
Figure 4:
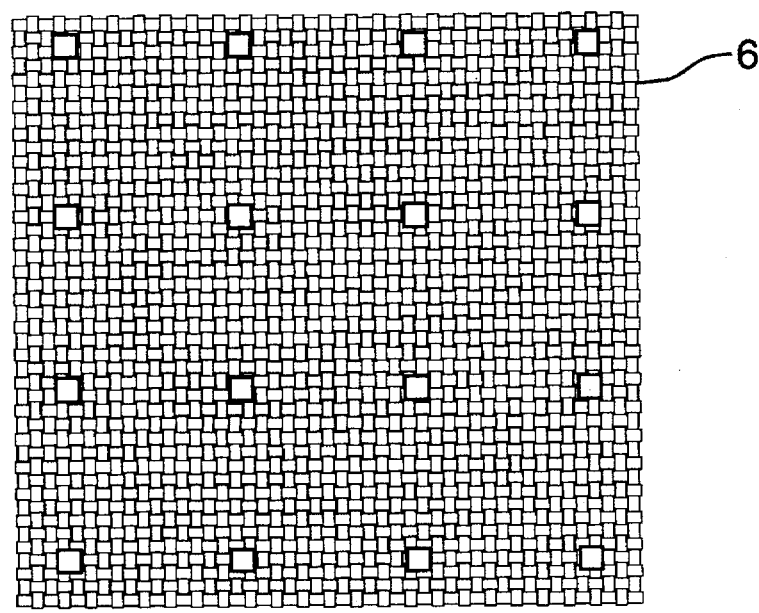
FIG. 4 is a top view of the glass mesh.
Figure 5:
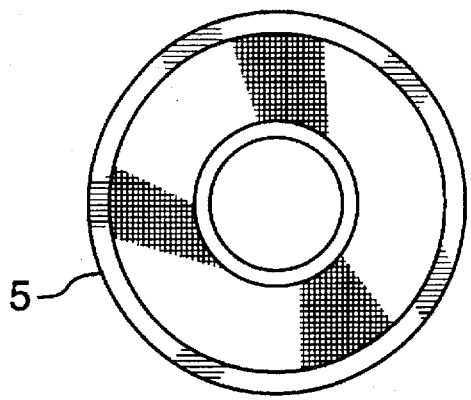
FIGS. 5, 6 and 7 are top, side and bottom views respectively of a basket, with glass mesh and perforated plate.
Figure 6:
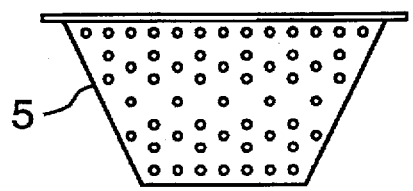
Figure 7:
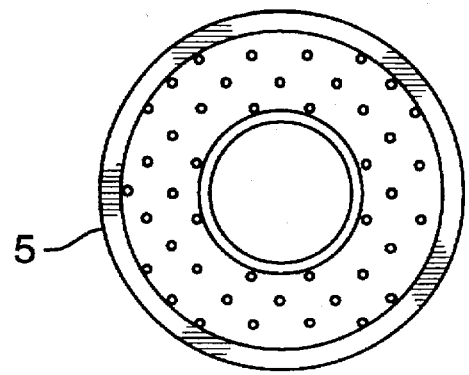

The reactor produces high mass transfer of pollutants to the mesh surface. This is a result of quick changes in water flow directions and high fluid velocities achieved in vicinity of the fiber mesh vicinity, as seen in FIG. 3. Sherwood numbers, characterizing mass transport, as high as 40 times with respect to the ones in packed beds, were achieved in the prototype unit. As a result, it was demonstrated that operation free of diffusional controls can be achieved at water flows of 500 cm$^3$/min in a reactor with 47 cm$^2$ cross-section and with water velocity of 3 cm/s-10 cm/s in the vicinity of the mesh.

The preparation of the mesh will now be described. Its preparation involved, first, impregnation of the glass mesh with titanium dioxide in the anatase form using different dispersions of TiO$_2$ in water-methanol. The glass mesh was pretreated with concentrated nitric acid to remove any extraneous additives coating the glass mesh surface. After the impregnation, the samples were washed with distilled water and dried for 4 hours at 110° C. The mesh samples were then analyzed using Scanning Electron Microscopy and Energy Dispersive X-Ray Microanalysis (SEM-EDX).

Figure 8:
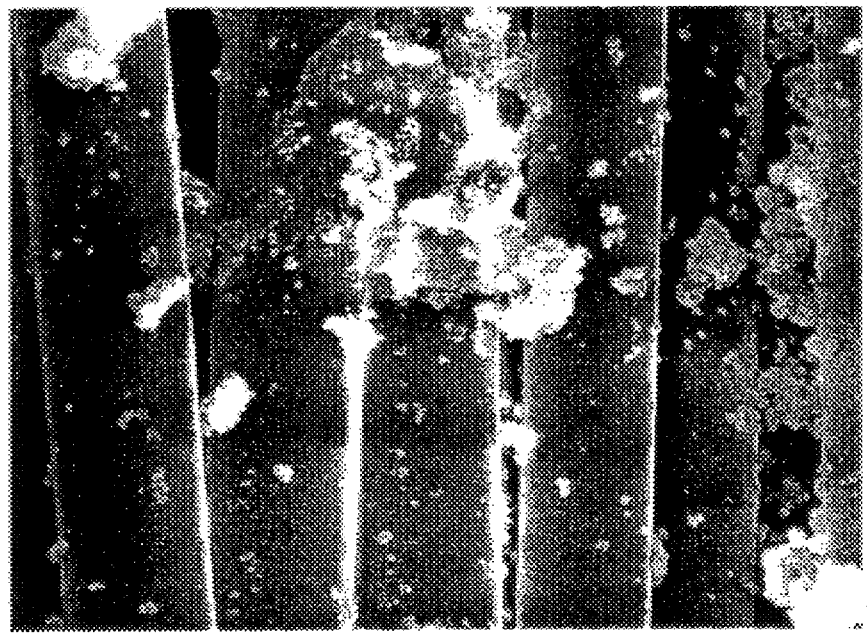
FIG. 8 is a SEM micrograph showing small (0.5 μm) and big (5–15 μm) agglomerates on the surface of the glass mesh fibers. Impregnated mesh was prepared using $TiO_2$ suspended in water.

Initial tests showed that when glass mesh was contacted with an aqueous dispersion of TiO$_2$ (anatase from Aldrich, with an average particle size of 0.55 µm), a poor dispersion of small particles and big particle aggregates was obtained. The smaller particles (<1 µm) were strongly held by the glass mesh and the bigger aggregated particles (>1 µm) were very loosely bonded and easy to remove. Both types of particles were observed in the SEM micrographs presented in FIG. 8.

Figure 9:
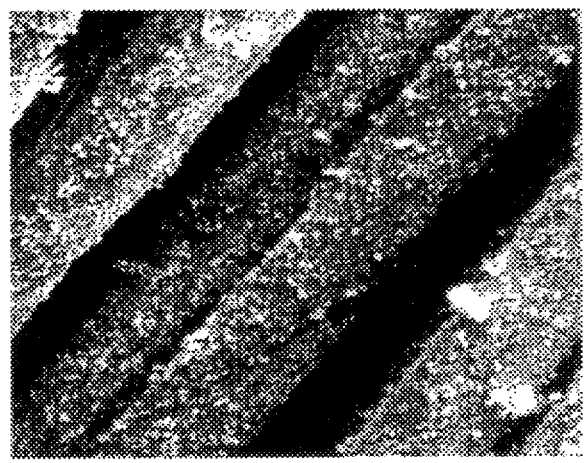
FIG. 9 shows small $TiO_2$ particles deposited on glass mesh prepared from $TiO_2$ suspended in methanol-water solutions (magnification 2000 and 1000 times)

However, when a dispersant such as methanol was added to the water-TiO$_2$ suspension, the amount of smaller particles held by the glass mesh fibers sharply increased. In this case, the number of bigger particle aggregates formed were, as shown in the second set of SEM micrographs (FIG. 9), much smaller. This means that the dispersion of particles on the fiber is higher when methanol solutions are used to prepare the TiO$_2$ dispersion. This also demonstrated that when dispersant fluids such as methanol are employed, the dispersant helps to enhance particle collection by the surface and consequently increases the final TiO$_2$ loading.

Figure 10:
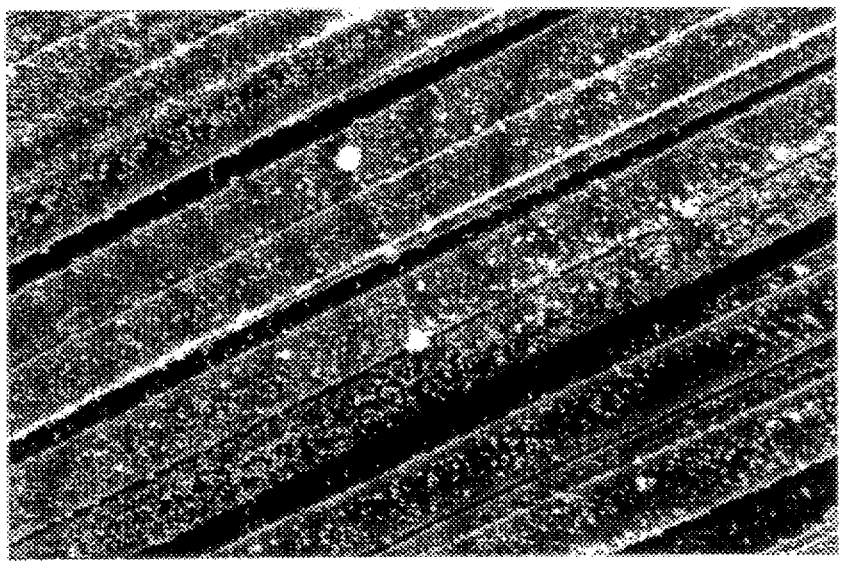
FIG. 10 is a SEM micrograph showing the uniform distribution of small $TiO_2$ agglomerates following the completion of the test for checking the strength of bonding ("anchoring test")

An "anchoring" test, using the apparatus, was carried out to assess the particle bonding strength to the mesh. Water was recirculated at a flow rate of 150 cm$^3$/min for over 2 hours. These fluid dynamic conditions are representative of the ones expected in reactor. Results obtained did not show, as it was demonstrated by SEM-EDX analysis, any major loss in the TiO$_2$ loading. Results are shown in FIG. 10. As it can be observed, comparing these micrographs with the ones of FIG. 9, there is no significant change in the particle loading after the mesh was subjected to 2 hours of operation.

In addition and in order to check the effect of TiO$_2$ particle size on "anchoring", Anatase, Degussa P-25 (20 nm) particles were used for impregnation under the same conditions as the Aldrich TiO$_2$ particles (500 nm) described before. It was demonstrated that similar results and similar loadings (8%) could be obtained. Thus, it appears that the TiO$_2$ particle size, in this particle size range studied, does not influence strongly the particle bonding to the surface.

Figure 11:
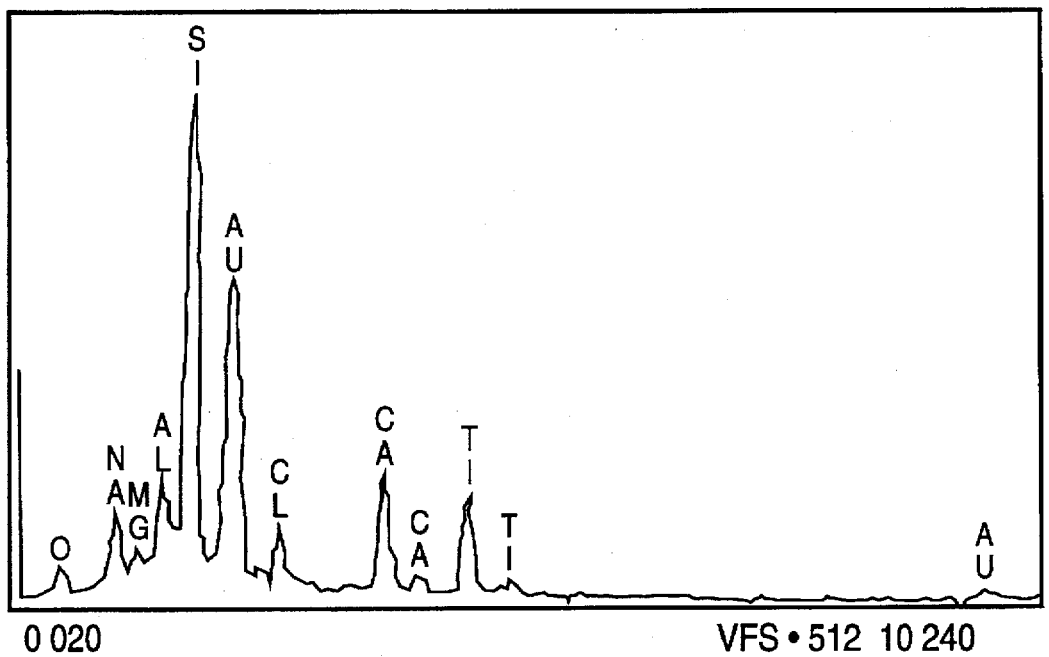
FIG. 11 is a typical SEM-EDX analysis report of a $TiO_2$-glass mesh sample. The Ti and Si peaks are used to track the $TiO_2$ on the glass mesh.

One important characteristic of mesh preparation effectiveness relates to the TiO$_2$ loading. In order to examine the loading characteristics of the TiO$_2$ photocatalyst, analysis of the different samples was carried out by using Scanning Electron Microscope-Energy Dispersive X-ray Microanalysis (SEMEDX) of TiO$_2$ on different sample regions. A characteristic analysis of the sample is shown in the FIG. 11. The bared glass-mesh used as support was also examined showing its composition as a Si-Ca-Al oxide matrix, with very small amounts of the oxides of Cr and Zn.

Experiments to optimize the photocatalyst preparation were also carried out using methanol-water solutions from 5 to 50%. It was found that at 25% of methanol in water a plateau was reached with a maximum 8.5 wt % of TiO$_2$. This was the maximum TiO$_2$ loading that could be added on the mesh surface.

Figure 12:
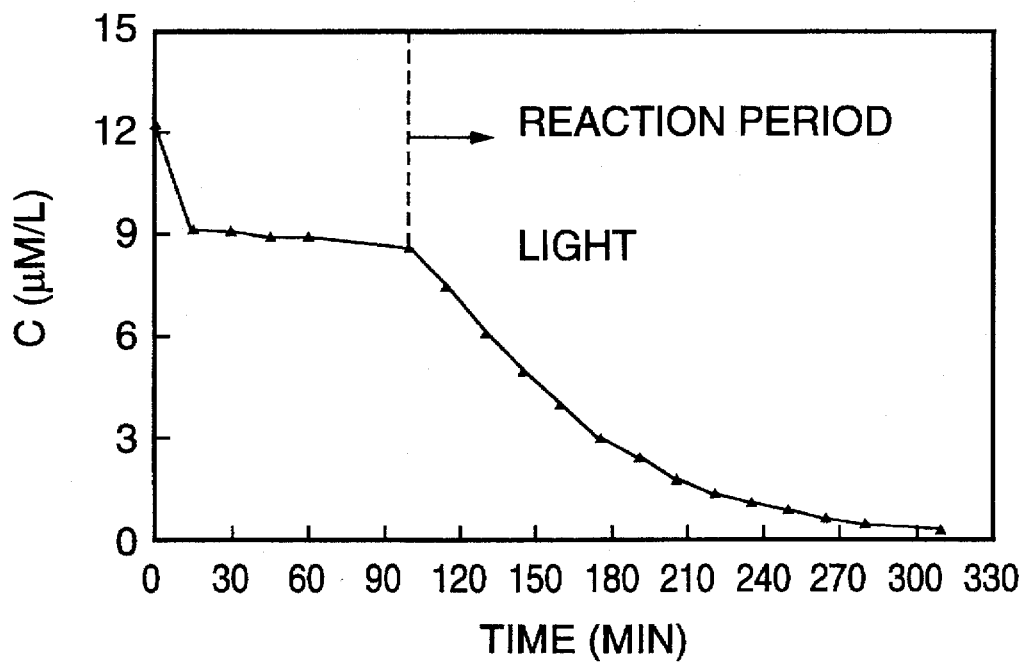
FIG. 12 shows experimental decay of Methylene blue (MeB) showing the adsorption of the Methylene blue on the $TiO_2$ supported glass mesh and the switching on of the U.V.lamp. MeB was selected as a model pollutant for testing of the photoreactor concept. The experimental run was conducted with: solution volume, 2.2 L; flow rate, 150 mL/min; lamp power, 15 W.; initial MeB concentration, 12 μM.

Several adsorption experiments for the system mesh-MeB solution were carried out for different initial concentrations of MeB approaching equilibrium. The results obtained are shown in FIG. 12. An initial steeply rising curve that gradually flattens off was obtained. The initial rise is related to the strong tendency of the TiO$_2$/mesh surface to bind the MeB molecules and the levelling off can be attributed to the saturation of these factors. The MeB adsorbed on TiO$_2$ loaded mesh approached saturation when a value of the equilibrium concentration of MeB of 24 µM is reached.

Figure 13:
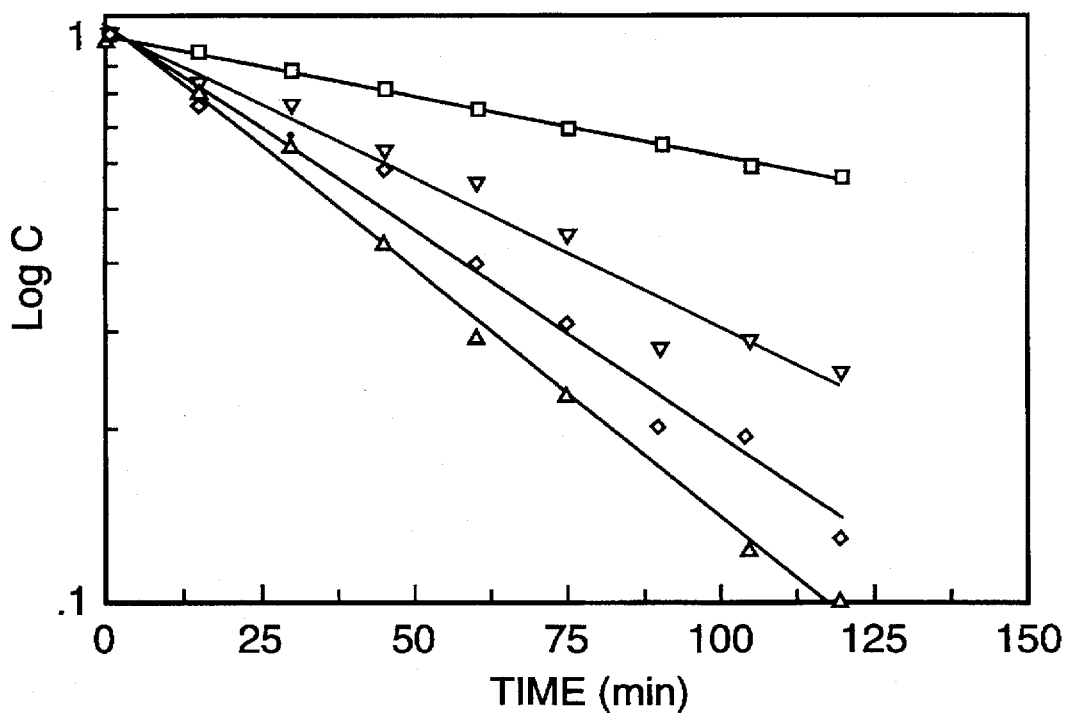
FIG. 13 shows the effect of initial concentration of MeB on the electric energy per order (EE/O). Experimental runs were conducted using the reactor with 15 baskets under the following conditions: solution volume, 2.2 liters; lamp power, 15 W; flow rate, 150 mL/min.

The effect of the initial concentration of methylene blue on the rate of disappearance from the solution was studied using different concentrations ranging from 6 to 50 µM, before adsorption. The experimental conditions are the following: flow rate: 150 mL/min, total volume 2.2 L, resident time, 14.7 min. lamp: 15 W., self filtering, fluorescent black light blue tube that produces radiation peaking at 365 nm and with a radiation output of 800 µW/cm$_2$ at a distance of 12". The experimental results are described in a semi-log graph in FIG. 13.

Photoconversion experiments were conducted in the prototype reactor. Methylene blue and phenol were used as a model pollutant. In these experiments, both the adequacy of the design of the baskets used in the prototype, as well as significant activity of the TiO$_2$-mesh, were fully confirmed. For example, a 50% conversion of 12 µmol/liter of methylene blue (2 liter solution) was achieved in 30 minutes of operation in a setup holding 10 baskets.

Figure 14:
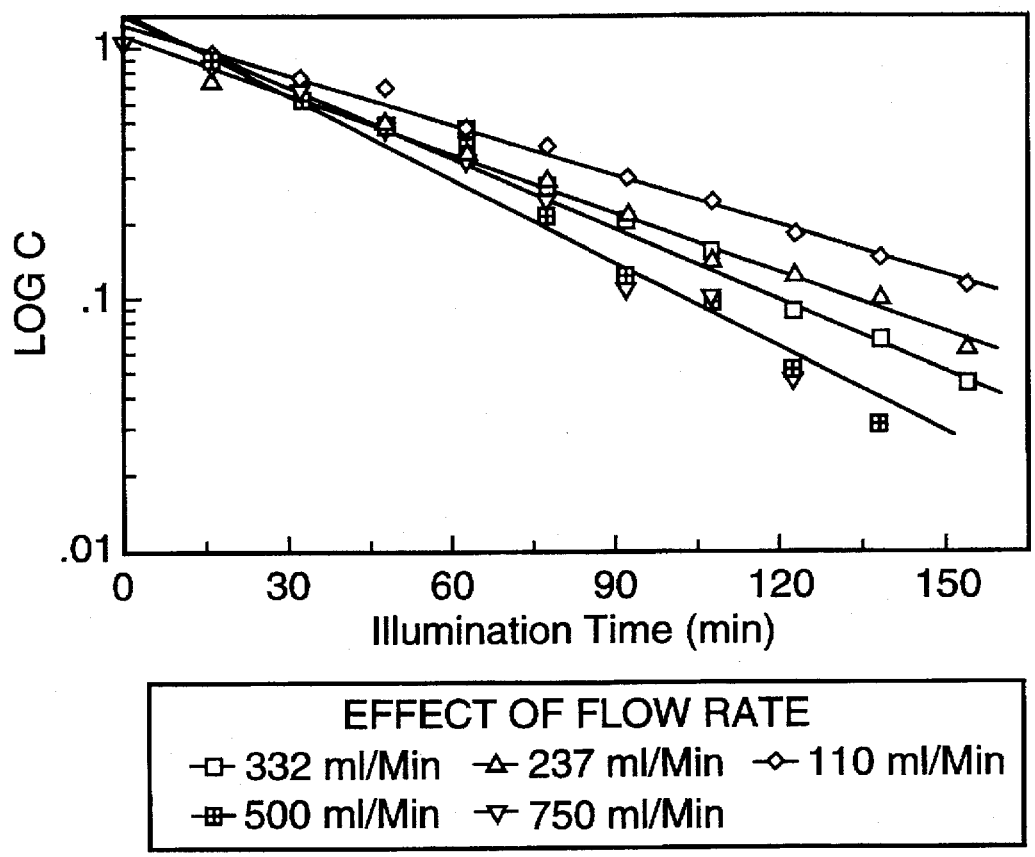
FIG. 14 shows experimental MeB concentrations for various times of reaction showing the effect of flow rate of water. The experimental run was conducted under the following conditions: solution volume, 2.2 L; lamp power, 15 W; initial MeB concentration, 12 μM.

Experiments to determine the effect of flow rate recirculation on MeB conversion were carried out in a range of 100 to 1000 mL/min with the following conditions: Total Volume: 2.2 L.; Initial MeB concentration: 12 µM. 15 W. BL lamp. The experiments were run for three hours including 1 hour for the dark reaction. The results of these experiments show that when the flow rate increases the apparent kinetic constant increases reaching a constant value at a flow rate of 500 cm$^3$/min. The results are described in FIG. 14 and Table 2.

TABLE 1

EFFECT OF INITIAL CONCENTRATION
Solution Volume: 2.2 L
Flow rate: 150 mL/min.
Lamp Power: 15 W.

| [MeB]$_o$, µM | Apparent Kinetic Rate Constant (min$^{-1}$) | Half life t$_{1/2}$ (min) |
|---|---|---|
| 3.8 | 0.021 ± 0.0015 | 34 |
| 9.4 | 0.017 ± 0.0012 | 42 |
| 20.4 | 0.012 ± 0.0014 | 56 |
| 39.4 | 0.005 ± 0.0015 | 135 |

TABLE 2

EFFECT OF FLOW RATE
Solution Volume: 2.2 L
Initial MeB Concentration: 12 μM
lamp Power: 15 W.

| Flow Rate (mL/min.) | Apparent Kinetic Rate Constant (min$^{-1}$.) | Half Life $t_{1/2}$ (Min) |
|---|---|---|
| 110 | 0.015 ± 0.0018 | 47 |
| 150 | 0.017 ± 0.0015 | 41 |
| 237 | 0.019 ± 0.0016 | 37 |
| 322 | 0.022 ± 0.0018 | 32 |
| 500 | 0.026 ± 0.0012 | 26 |
| 750 | 0.026 ± 0.0015 | 26 |

Since the photocatalytic degradation of the model pollutant in the systems tested follow first-order kinetics, it is possible to calculate the electrical efficiency of the photocatalytic process by using the so called figure-of-merit "Electrical Energy per order" (EE/O), which is defined as the electrical energy required to reduce the concentration of a pollutant by one order of magnitude in 1000 US gallons (3785L) of water. Smaller values of EE/O are considered to be a more efficient process, because less electrical energy is required.

Figure 15:
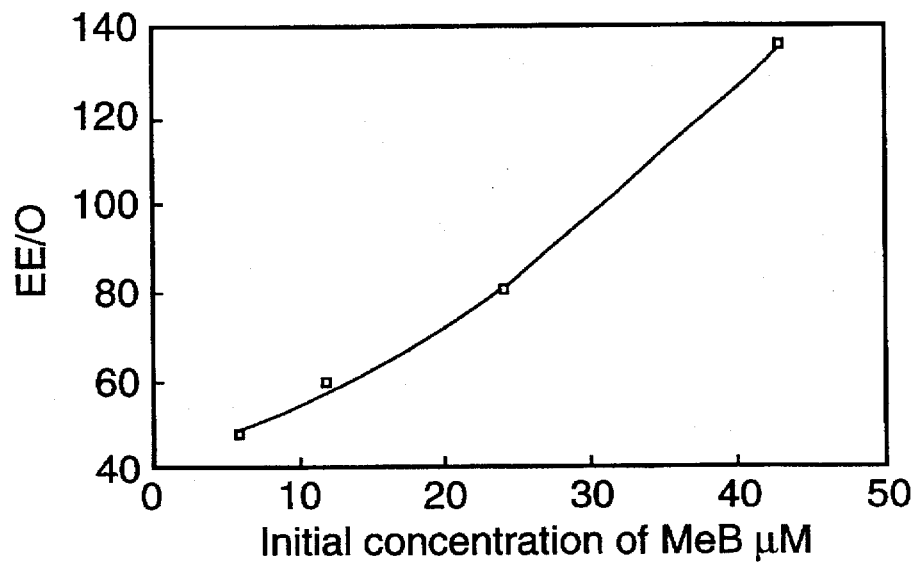
FIG. 15 shows the effect of initial concentration of MeB on the electric energy per order (EE/O). Experimental runs were conducted using the reactor with 15 baskets under the following conditions: solution volume, 2.2 liters; lamp power, 15 W; flow rate, 150 mL/min.
Figure 16:
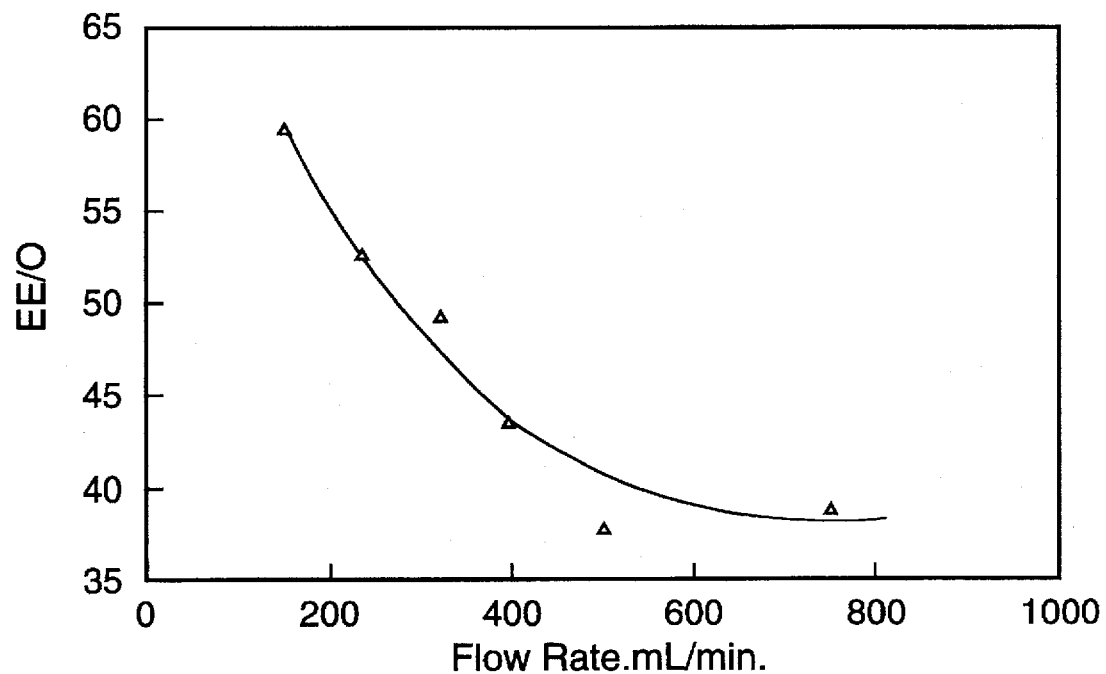
FIG. 16 shows the effect of flow rate on the electric energy per order (EE/O). Experimental runs were conducted using the reactor with 15 baskets under the following conditions: solution volume, 2.2 L; lamp power, 15 W; initial MeB concentration, 12 μM.

The EE/O values are calculated from the equation:

$$EE/O = \frac{P.(t/60).3785}{V.\log[C_i/C_f]} \quad (1)$$

Where P is the lamp power (kw), t is the irradiation time (min), V is the total volume (L) and $C_i$ and $C_f$ are the initial and final pollutant concentrations. The results obtained are shown in the FIGS. 15 and 16.

These results showed that with MeB concentration range of 3 to 50 μM and at flow rate of 150 mL/min, the values calculated are, EE/O=50 at [MeB]=3 μM; and EE/O=100 at [MeB]=50 μM. The best values are obtained at lower concentrations of model pollutant.

With experiments at different flow rates there is an increase in the photocatalytic efficiency (low EE/O) when the flow rate increases. The best value obtained was EE/O= 38 at 500 mL/min.

It is important to note that the reactor, with the experimental results obtained in a prototype reactor (150 hours of operation) and even without final optimization, is showing EE/O values in the range of 38. This is clearly encouraging and fully justifies the innovation introduced with the reactor. Furthermore, it is expected that with very plausible improvements of the reactor the EE/O will be reduced further to values in the range of 15. This should be considered as superior performance and excellent prospects for the reactor.

It is notable that high reaction rates are achieved even with such a weak lamp (15 W). The reason for that is a design that allows optimum contact between the pollutant in the solution with the illuminated TiO$_2$ supported on the glass mesh, eliminating the problems of mass transfer limitations that are present in other designs.

The reactor is a photocatalytic reactor, that could be brought on-stream for emergency situations in only a few minutes. The reactor is specially suited to deal with undesirable conditions of chemical leaks to the water cooling system or the heavy rains in chemical plants. The reactor, as proposed in this application, has superior characteristics for emergency situations and it is in the area of development and application of this technology where petrochemical companies like the ones based in Sarnia chemical valley could benefit the most. These photocatalytic reactors could essentially be brought on-stream in a short period of time, achieving complete mineralization of chlorophenolic compounds into HCl, CO$_2$ and H$_2$O.

It will be appreciated that the above description relates to the preferred embodiment by way of example only. Many variations on the invention will be obvious to those knowledgeable in the field, and such obvious variations are within the scope of the invention as described and claimed, whether or not expressly described.

For example, it should be appreciated that sunlight could be used as the light source, since about 4% of solar energy contains wavelengths which excite TiO$_2$. The potential use of these reactors with sunlight makes this system even more practical for future commercialization. Once the principles for high PTEP are established, a number of embodiments can be proposed, including solar energy applications.

Figure 17:
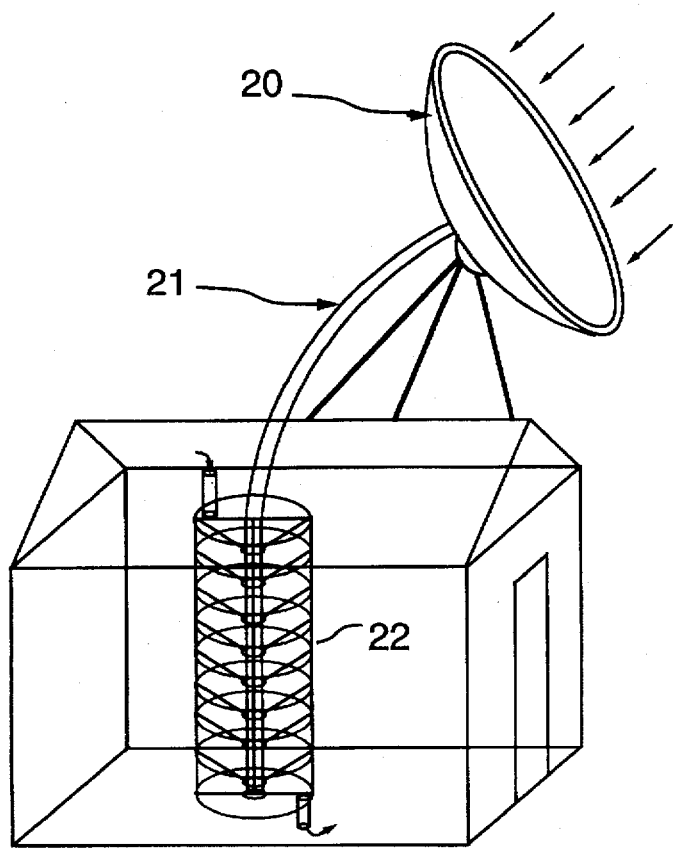
FIG. 17 shows a possible configuration using sunlight as the light source.

One possible solar configuration, illustrated in FIG. 17, would involve a parabolic solar collector 20 with a fiber optic bundle 21 transporting the light beam to the reactor 22. The fiber optic bundle is placed in the central tube of a vertical unit. The fiber optic bundle has its cladding removed inside the reactor, allowing for light disperion and illumination of the glass mesh. This design can work with concentrated levels of solar irradiation at temperatures above ambient (e.g. 50° C.), which may significantly speed up photoconversion rates. In this configuration a parabolic solar collector is placed, for example, outside a building or in the field. The solar collector has as well a mechanism for following the sun, optimizing sunlight collection. The photoreactor unit itself is placed indoors.

Figure 18:
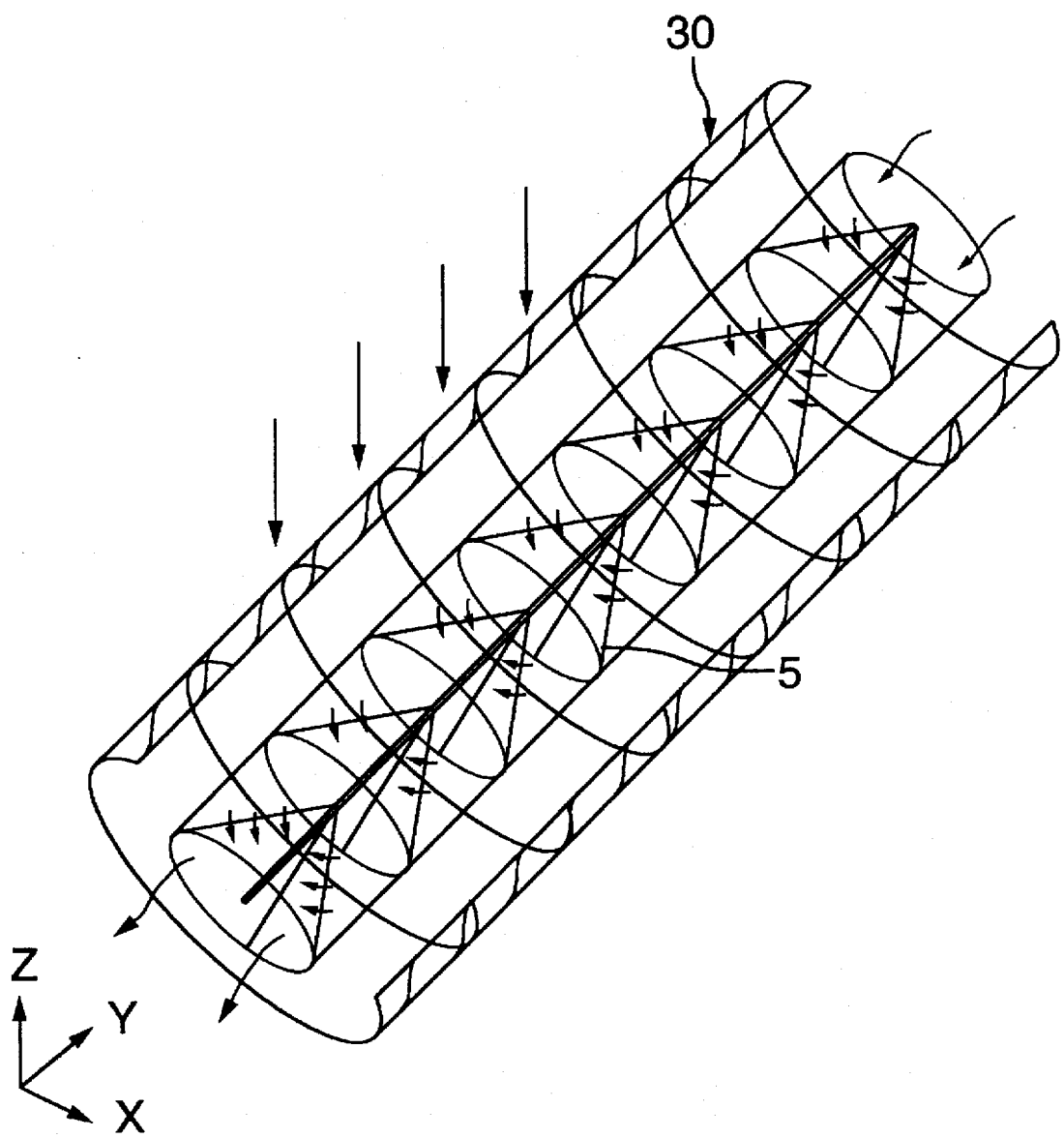
FIG. 18 shows an alternative solar configuration.

An alternative solar configuration would have a solar reflector 30 wrapping around a portion of the reactor, to collect and reflect sunlight onto the outside of the reactor, as shown in FIG. 18. Glass mesh would be supported on baskets, as in the preferred embodiments, but with an orientation opposite that of the preferred embodiments, and with the water percolating through in the opposite direction.

Another possible variation is in the orientation of the unit. The unit is shown and described in a vertical orientation, which is advantageous since gravity can be employed to advantage and since uniform flow is easier to achieve. However, it should be understood that it is not strictly essential that the unit be arranged vertically; it could be horizontal, or inclined, as desired.

It should also be clearly understood that although the baskets are ideally oriented at 45 degrees from the axis of the unit, that precise angle is not essential. Any substantial angle would obviously produce good results, but 45 degrees is preferred in terms of exposure to the light, and water flow, mass transfer, etc.

What is claimed as the invention is:

1. A photocatalytic reactor, comprising two tubes arranged concentrically about an axis, one having a larger diameter than the other, said tubes thus defining an inner channel and an outer channel, said outer channel being connected to have water flowed therethrough, said inner channel containing an elongated light source along said axis, radiating light outwardly, said light including a substantial component of light having a wavelength of less than 390 nm, said outer channel having at least one truncated conical basket arranged therein, said basket covering all of said channel and having a face supporting a fiber glass mesh thereon, said face and mesh being exposed towards said light by virtue of said face being angled to define said truncated conical shape, said basket further having a plurality of small apertures therethrough to permit water to pass therethrough, said mesh being impregnated with TiO$_2$ particles.

2. A reactor as recited in claim 1, where said outer channel has a reflective inner surface.

3. A reactor as recited in claim 1, where said basket faces are angled at 45 degrees from said axis.

4. A reactor as recited in claim 1, where said $TiO_2$ particles are in the anatase crystalline form.

5. A reactor as recited in claim 1, where said elongated light source is a fiber optic bundle which directs light received from a solar collector.

6. A photocatalytic reactor, comprising a cylindrical tube arranged about an axis, and defining an inner channel, said tube being connected to have water flowed therethrough, and a solar collector/reflector comprising a cylinder with a large longitudinal portion removed, said cylinder also arranged about said axis, outside said tube, the inside of said cylinder being reflective so as to reflect sunlight inwardly, said tube having at least one conical basket arranged therein, said basket covering all of said tube inner channel and having a face supporting a fiber glass mesh thereon, said face and mesh being exposed towards said sunlight, whether reflected or direct, by virtue of said face being angled to define said conical shape, said basket further having a plurality of small apertures therethrough to permit water to pass therethrough, said mesh being impregnated with $TiO_2$ particles from a solar collector.

7. A reactor as recited in claim 6, where said basket faces are angled at 45 degrees from said axis.

8. A reactor as recited in claim 6, where said $TiO_2$ particles are in the anatase crystalline form.

9. A method of treating contaminated water, comprising flowing said water through a photocatalytic reactor, said reactor comprising two tubes arranged concentrically about an axis, one having a larger diameter than the other, said tubes thus defining an inner channel and an outer channel, said outer channel being connected to have water flowed therethrough, said inner channel containing an elongated light source along said axis, radiating light outwardly, said light including a substantial component of light having a wavelength of less than 390 nm, said outer channel having at least one truncated conical basket arranged therein, said basket covering all of said channel and having a face supporting a fiber glass mesh thereon, said face and mesh being exposed towards said light by virtue of said face being angled to define said truncated conical shape, said basket further having a plurality of small apertures therethrough to permit water to pass therethrough, said mesh being impregnated with $TiO_2$ particles.

\* \* \* \* \*

UNITED STATES PATENT AND TRADEMARK OFFICE
CERTIFICATE OF CORRECTION

PATENT NO. : 5,683,589
DATED : November 4, 1997
INVENTOR(S) : DE LASA, Hugo; VALLADARES, Julio It is certified that error appears in the above-identified patent and that said Letters Patent is hereby corrected as shown below:

Column 11, line 25, cancel "from a solar collector".

Signed and Sealed this

Seventeenth Day of February, 1998

Attest:

BRUCE LEHMAN

Attesting Officer     Commissioner of Patents and Trademarks